March 8, 1949.　　　　R. K. POTTER　　　　2,463,642

WAVE ANALYSIS

Filed Dec. 4, 1946

INVENTOR
R. K. POTTER
BY
Robert J. Pluskey
ATTORNEY

Patented Mar. 8, 1949

2,463,642

UNITED STATES PATENT OFFICE 2,463,642

WAVE ANALYSIS

Ralph K. Potter, Morristown, N. J., assignor to Bell Telephone Laboratories, Incorporated, New York, N. Y., a corporation of New York Application December 4, 1946, Serial No. 714,061

7 Claims. (Cl. 179—1)

This invention relates to the analysis of complex waves, and, more particularly, to method and means for producing a visible representation of the relation between intensity and frequency of a selected complex wave corresponding to any sound wave or fragment thereof.

In the present inventor's United States Patent 2,403,997, dated July 16, 1946, there is disclosed method and means for producing a spectrogram respective to a speech sound. Such a spectrogram constitutes a visible representation of the speech sound and comprises three dimensions, one dimension having the significance of frequency, a second having the significance of time and a third having the significance of wave energy content or intensity. In the referenced patent, the dimension having the significance of wave energy content or intensity is evidenced by the brightness or darkness of minute areas of the spectrogram defined by the intersection of selected frequency and time values. In certain studies based upon these sound spectograms it is useful to have a visible representation or record of the relationship between the wave energy content or intensity and frequency for brief intervals of time and to greater accuracy than is afforded by graduated brightness or darkness of the spectrogram record. Such records of the frequency-intensity relation for an instant of time have been called "cross-section patterns" because they are in effect cross-sections of the three-dimensional spectrogram representing conditions at certain instants of time. In order that the spectrogram and the instantaneous record be comparable it is also desirable to use, for the purpose of making this more accurate record of the instantaneous frequency-intensity distribution, analyzing circuits with the same characteristics as those employed in making the spectrogram.

An object of the invention is the provision of means and method for visibly representing or recording the relation of wave energy content or intensity and frequency at particular instants of time in a complex wave.

In accordance with this invention, the sound sample that is to be analyzed with reference to a momentary intensity-frequency relationship is converted into an electric wave corresponding thereto, and is recorded in a form enabling repeated reproductions thereof. The recorded wave is repeatedly reproduced and on each reproduction a successively different frequency component or narrow band of the frequencies in the frequency range of the complex wave is converted into a signal wave, the voltage of which varies in proportion to the average wave intensity of the successive different frequency components or narrow frequency bands. Simultaneous with the repeated reproductions of the complex wave, there is generated a periodic saw-tooth voltage wave, the generation of the saw-tooth voltage wave and the successive reproductions of the complex wave being in synchronism. The signal wave derived from the complex wave and the periodic voltage wave are continually compared, and for each instance of equality in value of the instantaneous voltages of the two waves, a visible indication or record is made on an appropriate record surface whose movement is correlated with the frequency scanning of the complex wave and the production of the periodic saw-tooth voltage wave. As successive indications are obtained for the successively different frequency components or frequency bands, a curve or trace is gradually developed on the record surface, whose dimensions may be so chosen that one has the significance of a frequency axis and the other has the significance of a wave energy or intensity axis. The comparison of the derived voltage wave and the periodic voltage wave is accomplished by feeding the two waves to respective windings of a coil having a saturable core, a third winding of the coil being adapted to have a momentary current or pulse developed therein upon change in the saturated condition of the coil when the inputs to the other two coils are of equal but opposite effects. If desired or necessary, the pulse so generated may be amplified before transmission to the recording means for development at the latter of the referred to visible indication.

A more complete understanding of the invention will be obtained from the detailed description that follows taken in conjunction with the appended drawing, wherein.

Figure 1:
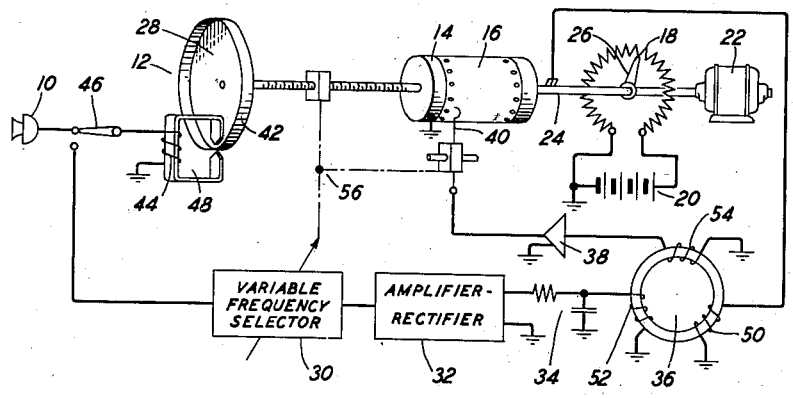
Fig. 1 illustrates an arrangement for the practice of the invention.

One arrangement for practicing the invention is shown in Fig. 1. This arrangement comprises in general a speech-bearing waves translating device or microphone 10, a magnetic band or tape type recorder-reproducer 12, a cylindrical drum or chart carrier 14 adapted to mount or support an electrosensitive chart 16, a rheostat 18 and associated current source or battery 20, and a motor 22 for rotating the shaft 24 on which the drum, the rotatable arm 26 of the rheostat and the disc portion 28 of the recorder-reproducer are mounted. The arrangement also includes a frequency selective device 30 adapted to transmit successively different individual frequencies or narrow bands of frequencies within the frequency range of interest, an amplifier-rectifier device 32 for converting the output of the frequency selective device into a unidirectional current, a smoothing network 34 comprising a resistance and a capacitance, a saturable-core or kick coil 36, and an amplifier 38 for transmitting the output of the coil to a spring contact 40 having a needle-like point in engagement with the electrosensitive chart 16. The electrosensitive chart may comprise, for example, a titanium oxide-carbon recording paper, which, as the name suggests, has a thin layer of titanium oxide on the recording face and a carbon backing. The drum 14 may have a metallic face, and it is between the latter and the contact 40 that, as described later herein, potential is applied to cause the chart to have a mark or record made thereon. The recorder-reproducer includes an endless band or tape 42 of magnetic material on the peripheral portion of the disc 28, the band or tape being adapted to have a magnetic record made thereon in accordance with signal currents incoming to the translator winding 44 of the recorder. The record on the magnetic tape may comprise a magnetic record corresponding to that of a brief sample of sounds that have been impressed on the input 10, from another record of sound in which samples are selected for analysis. When the switch 46 is adjusted to its alternative position and the disc 28 is rotated, the magnetic record of the sound sample on the tape 42 is converted into corresponding electric waves by the electro-magnetic translator 48 of the recorder-reproducer. Repeated rotations of the disc 28 result in a repeated reproduction or translation of the magnetic record into corresponding electric currents in the winding 44 and transmission to the frequency selective device 30.

Figure 2:
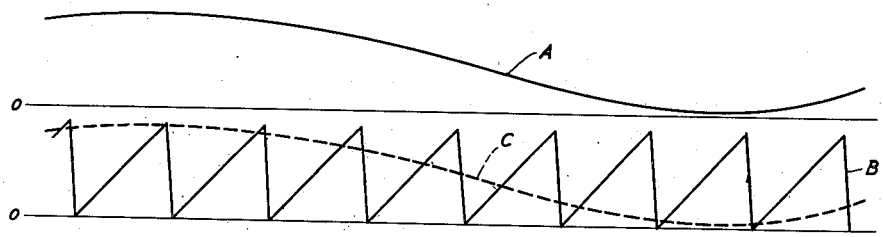
Fig. 2 are illustrative curves referred to in explaining the mode of operation of the arrangement of Fig. 1.

During each rotation of the disc 28 there will be a corresponding rotation of the drum 14 and of the rotatable arm 26 of the rheostat. Each complete rotation of the arm 26 results in the production of a gradually increasing current flow in one winding 50 of the coil 36, the current being abruptly reduced to an initial zero value, successive rotations of the rheostat arm resulting, in effect, in the impressing of a saw-tooth or sweep potential on the winding 50, for example, as illustrated by curve B of Fig. 2. Simultaneously with the impressing of the saw-tooth wave on the winding 50, the relatively slowly varying unidirectional wave is impressed on the winding 52 of the coil 36 from the smoothing network 34. This latter wave is obtained as a result of the selective frequency devices transmitting into the smoothing network 34 the frequency or narrow band of frequencies of the frequency range impressed on it and frequency band has been amplified and rectified in the circuit 32. The time constant of the network 34 is preferably chosen sufficiently high or of such suitable value that current discharge therefrom is at a rate that is suitably related to the rate of analysis. Curve A of Fig. 2 illustrates the wave form that the current from the smoothing network might take for a series (here eight) of successive revolutions of the saw-toothed sweep. The windings 50 and 52 are arranged in such fashion that the currents flowing therein have an opposing effect with respect to the magnetization of the saturable core. If the latter is of a material characterized by high permeability at low magnetizing forces and adapted to saturate at comparatively low magnetizing forces, and the current inputs to the coils 50, 52 are each normally sufficient to result in the saturation of the core, a momentary condition in which the inputs to the windings 50, 52 are equal thereby shifting the core from saturated to non-saturated condition, will result in a spurt or pulse being generated in the third winding 54 of the coil 36. This pulse appropriately amplified by amplifying device 38 and fed to the spring contact 40 results in a discoloration mark or record of the pulse being made on the chart 16. With successive rotations of the driving shaft, successively different frequencies or frequency bands will provide the basis for a pulse being generated in the coil 54 with a resultant mark or record respective to such frequency or frequency bands being made on the chart 16. The frequency selective or transmitting position of the frequency selective device is correlated with the position of the contact 40 associated with the chart 16, as indicated by the linkage 56, such that for successive frequencies or successive frequency bands the needle occupies a slightly advanced position longitudinally along the axis of rotation of the drum and chart.

Figure 3:
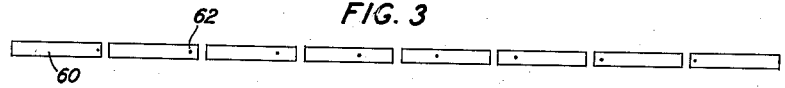
Fig. 3 illustrates elemental strips of a chart bearing marks or records in accordance with the invention.

Fig. 2 shows in curve A the varying output wave supplied to the coil 36 from the smoothing network, and in curve B, the saw-tooth wave supplied to the kick coil from the rheostat arrangement associated with the shaft 24. The dotted line-curve C represents curve A superimposed on curve B to illustrate the successive points on the curve A at which the input to the winding 50 would be substantially equal to the amplitude of the wave of curve B. In Fig. 3 are shown a plurality of elongated rectangular strips 60, each simulating an elemental strip of the chart 16 with which the contact 40 is in engagement during one rotation of the drum 14. The dot 62 on each of these strips appears at a respective position for the frequency or frequency band involved and the relative amplitude of the wave of curve A at the instant that the saw tooth input is substantially equal to that from the smoothing network.

Figure 4:
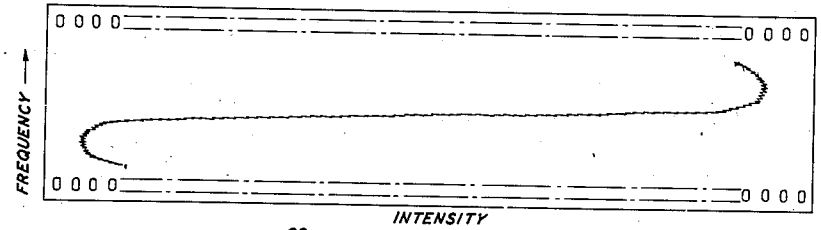
Fig. 4 illustrates a form of the intensity-frequency chart obtained in accordance with the invention.

As the sound sample on the magnetic tape is reproduced successively many times the waves corresponding thereto are scanned frequency by frequency, or frequency band by frequency band, until the entire frequency range has been covered, and laterally adjacent marks or records are successively made on the chart 16 to result in a chart such as is illustrated in Fig. 4, in which the vertical edge or dimension has the significance of frequency and the horizontal edge or dimension has the significance of average intensity or wave power content.

Figure 5:
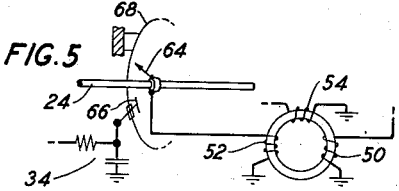
Fig. 5 illustrates a modification of the arrangement of Fig. 1 whereby portions of a particular recorded sound may be analyzed in accordance with this invention.

The record of wave intensity or wave power content with frequency may be obtained for a specific speech sound, for example, a vowel or a specific word; or if desired, may be respective only to a portion or a fragment of a particular speech sound, or any sound that it is desired to examine in this manner. In the latter case, for each complete revolution of the recording drum only a preselected portion of the energy stored in the smoothing network 34 would be supplied to the winding 52 of the coil 36; this portion of the energy corresponding to that fragment of the waves recorded on the magnetic tape that it is desired to scrutinize from the standpoint of the wave amplitude with frequency relationship. In order to accomplish this, the circuit connection between the smoothing network 34 and the coil 52 may have interposed therein, as illustrated by Fig. 5, a contact arrangement in which a contact wiper or arm 64 is mounted on the shaft 24 for rotation therewith, and is adapted to engage with an adjustable arcuately-shaped contact 66 of dimensions preselected with respect to the length of sample on the magnetic tape 42 that it is desired to examine. The contact 66 may be adjusted in position along the circular support 68 to correspond to any desired portion or sample of the complex waves recorded on the tape 42. This arrangement might be located on the shaft 24 between the motor 22 and the rheostat 18. For an arrangement of this character, the time constant of the smoothing network preferably is of a low value or at least adjusted with respect to the proportions of the sample of the recorded material.

The chart showing the wave amplitude or intensity with frequency relationship may be used to supplement the information made available by spectrograms of the type obtainable in accordance with the teachings of the present inventor's United States Patent 2,403,997 of July 16, 1946, particularly that portion thereof descriptive of the arrangement of Fig. 4 of the patent. The wave intensity-frequency chart obtained in accordance with the present invention may be taken as a part of the operation of obtaining a particular spectrogram and be based upon the recording from which the spectrogram is obtained.

What is claimed is:

1. The method that comprises recording a sample of sound wave, generating a periodic signal wave, reproducing the recorded wave repeatedly in synchronism with said signal wave, deriving from said reproduced wave a signal wave varying in proportion to the average intensity of the wave content of successive different component frequencies of the reproduced wave during corresponding different reproductions, comparing the values of a like parameter of the derived wave and of the periodic signal wave, and visually indicating the instances of equal values of the compared parameters.

2. The method that comprises recording sound waves, generating a periodic signal wave, reproducing the recorded waves repeatedly in synchronism with said signal wave, deriving from said reproduced wave a signal wave varying in proportion to the average intensity of the wave content of successive different component frequencies of the reproduced wave during corresponding different reproductions, moving a marking element relative to and across a record surface along different paths during corresponding different reproductions, and causing the marking element to mark the record surface whenever the said compared values are equal.

3. The method that comprises recording complex waves for a selected time interval, generating a periodic saw-tooth voltage wave, reproducing the recorded wave repeatedly and in synchronism with the periodic wave, deriving from said reproduced wave a voltage that is proportional to the average intensity of the wave content of successive different component frequency bands of the reproduced wave during corresponding different reproductions thereof, comparing the derived voltage with the voltage of the periodic wave, moving a marking element relative to a record surface along different paths corresponding to different reproductions, and causing the marking element to mark the surface whenever the compared voltages are equal.

4. In combination, means for generating a periodic signal wave, means for repeatedly reproducing a complex electric wave in synchronism with said periodic wave, means for deriving from each such complex wave reproduced a signal wave that varies in proportion to the average intensity of the wave content of successively different frequency components of such complex wave during corresponding different reproductions thereof, and means for comparing the values of a like parameter of the derived wave and of the periodic wave during each such reproduction and for recording the instances in which the compared values are equal.

5. In combination, means for generating a periodic saw-tooth voltage wave, means for repeatedly reproducing a complex electric wave in synchronism with said periodic wave, means for deriving from each such complex wave a voltage that is proportionate to the average intensity of the wave content of successive different frequency components of the complex wave during corresponding reproductions of said complex wave, and means for continually comparing the values of the derived voltage and the voltage of said periodic wave during each such reproduction and for recording the instances in which the compared values are equal.

6. In combination, means for generating a periodic signal wave, means for repeatedly producing in synchronism with said periodic wave a complex wave corresponding to sound waves, means for deriving from each such complex wave produced a signal wave that is proportionate to the average intensity of the wave content of successively different component frequency bands of the complex wave during corresponding different productions of the complex wave, means for comparing the values of a like parameter of the derived wave and of the periodic wave during each such production, and means comprising a record surface and a marking element movable relative to the record surface along different paths during corresponding different productions of said complex wave for indicating on said record surface instances of equal values of the compared parameters.

7. The method that comprises repeatedly generating an electric wave corresponding to a sample of sound wave in synchronism with a simultaneously generated comparison wave, deriving from said electric wave a signal wave varying in proportion to the average intensity of the wave content of successive different frequency portions of the electric wave, comparing the instantaneous values of the derived and comparison waves, and visibly indicating the instances of equal values of said waves.

RALPH K. POTTER.

REFERENCES CITED

The following references are of record in the file of this patent:

UNITED STATES PATENTS

| Number | Name | Date |
| --- | --- | --- |
| 2,403,984 | Koenig et al. | July 16, 1946 |